Patented Jan. 20, 1953

2,626,263

UNITED STATES PATENT OFFICE 2,626,263

HYDANTOIN DERIVATIVE

Roger Gaudry, Sillery, Quebec, Canada, assignor to Ayerst, McKenna & Harrison, Limited, Saint Laurent, Quebec, Canada, a corporation of Canada No Drawing. Application July 5, 1951,
Serial No. 235,366

4 Claims. (Cl. 260—309.5)

The present invention relates to 5-γ-hydroxypropyl hydantoin which is a useful intermediate in the preparation of the growth promoting agent dl-α-amino-5-hydroxy valeric acid.

The new hydantoin may be obtained by treating γ-hydroxy butyraldehyde with an alkaline metal cyanide in the presence of a mineral acid to form the corresponding α-δ-dihydroxy valeric nitrile, and treating the nitrile obtained with ammonium carbonate to form the desired hydantoin. When proceeding accordingly it has been found that the hydantoin is difficultly purified. According to the present invention it has been found that the hydantoin may be readily separated by hydrolyzing the reaction mixture containing the hydantoin to form dl-α-amino-δ-hydroxy valeric acid which can be reconverted to the hydantoin by reaction with an alkali metal cyanate in the presence of hydrochloric acid.

The desired hydantoin may also be obtained by reacting the starting γ-butyraldehyde with an alkali cyanide in the presence of ammonium chloride to form the corresponding α-amino-δ-hydroxy valeric nitrile acid which can be converted to the desired hydantoin by treatment with ammonium carbonate.

If desired the α-amino-δ-hydroxy valeric nitrile may be hydrolyzed to form the dl-α-amino-δ-hydroxy valeric acid which may then be converted to the desired hydantoin by treatment with an alkali metal cyanate followed by heating in the presence of an acid.

The 5-γ-hydroxypropyl hydantoin is separated from the reaction mixture by extraction with an organic solvent such as, alcohol or acetone and upon evaporation of the solvent, crystals are obtained.

The preparation of 5-γ-hydroxypropyl hydantoin of the present invention may be illustrated by referring to the following formulae:

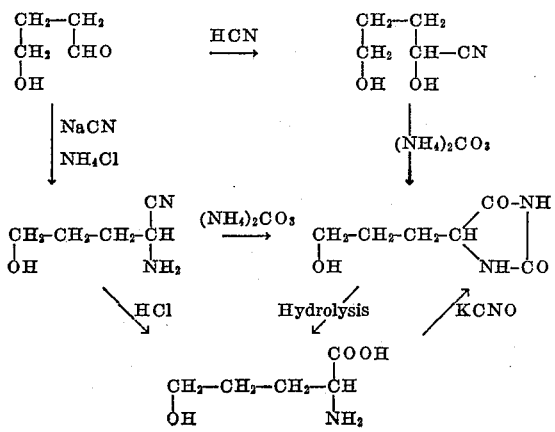

EXAMPLES

The following examples illustrate the preferred methods for preparing the new compounds of the present invention and should be considered as illustrating rather than limiting the present invention.

Example 1

2,3-dihydrofuran (40 g., 0.5 mole of a product titrating 88%) was added to 0.02 N hydrochloric acid (100 ml.) and the mixture was mechanically stirred at room temperature until the dihydrofuran was completely dissolved (about ten minutes). There was thus obtained γ-hydroxybutyraldehyde solution which was added slowly to a solution of sodium cyanide (26 g.) and ammonium chloride (27 g.) in water (100 ml.) and the mixture was stirred at room temperature for one hour. Fresh ammonium carbonate (106 g.) was then added, the mixture stirred at 55°–60° C. for two hours, then at the boiling point for 15 minutes and evaporated to dryness "in vacuo." The hot residue was stirred with absolute ethyl alcohol (200 ml.) the insoluble sodium chloride (28.5 g., 98%) was filtered on a Buechner funnel, washed on the filter with a little absolute alcohol, and the alcoholic solution was evaporated to dryness "in vacuo." The residue contained 5-γ-hydroxypropyl hydantoin which was confirmed by hydrolyzing the residue with barium hydroxide to give dl-α-amino-δ-hydroxy valeric acid which was identified by its melting point and its analysis.

Calculated for $C_5H_{11}O_3N$ _____ N, 10.52%
Found _____ N, 10.57%

Example 2

40 g. of 2,3-dihydrofuran were added to 100 ml. of 0.02 N hydrochloric acid and the mixture stirred mechanically at room temperature for a period of about 10 minutes after which the dihydrofuran had completely dissolved. The resulting solution which contained γ-hydroxybutyraldehyde was then slowly added to a solution containing 26 g. of sodium cyanide and 26 g. of sulfuric acid and the mixture was stirred at room temperature for one hour. The reaction solution contained α,δ-dihydroxy-valeric nitrile to which was added 106 g. of ammonium carbonate and the mixture was stirred for about 2 hours, at a temperature of about 55–60° C. The mixture was then boiled for 15 minutes and evaporated to dryness in vacuo. The dry residue contained the 5-γ-hydroxybutyl hydantoin which was identified as in Example 1.

Example 3 dl-α-Amino-δ-hydroxy valeric acid which had been obtained by the hydrolysis of α-amino-δ-hydroxy valerianic nitrile was treated with potassium cyanate in the presence of hydrochloric acid to form 5-γ-hydroxy propyl hydantoin which was easily removed from the reaction mixture and identified as in Example 1.

I claim:

1. As a new compound, 5-γ-hydroxypropyl hydantoin.

2. In the preparation of 5-γ-hydroxypropyl hydantoin, the method of recovering said hydantoin in purified form from reaction mixtures in which it is present which comprises hydrolyzing said 5-γ-hydroxypropyl hydantoin to dl-α-amino-δ-hydroxyvaleric acid, treating said dl-α-amino-δ-hydroxyvaleric acid with an alkali metal cyanate and a mineral acid, and recovering 5-γ-hydroxypropyl hydantoin.

3. In a process for preparing 5-γ-hydroxypropyl hydantoin, the steps of reacting γ-hydroxybutyraldehyde with an alkali metal cyanide in the presence of ammonium chloride to form the corresponding α-amino-δ-hydroxy valeric nitrile, and reacting said nitrile with ammonium carbonate to form the corresponding 5-γ-hydroxypropyl hydantoin.

4. In a process for preparing 5-γ-hydroxypropyl hydantoin, the steps of reacting γ-hydroxybutyraldehyde with an alkali metal cyanide in presence of one equivalent of a mineral acid to form the corresponding α,δ-dihydroxy valeric nitrile and reacting said nitrile with ammonium carbonate to form the corresponding 5-γ-hydroxypropyl hydantoin.

ROGER GAUDRY.

REFERENCES CITED

The following references are of record in the file of this patent:

UNITED STATES PATENTS

| Number | Name | Date |
| --- | --- | --- |
| 2,391,799 | Rogers | Dec. 25, 1945 |
| 2,564,647 | Rogers | Aug. 14, 1951 |

OTHER REFERENCES

Gaudry, Canadian Journal Research, vol. 26 (1948), pp. 387–397.